United States Patent

Sierra

[15] 3,648,038

[45] Mar. 7, 1972

[54] APPARATUS AND METHOD FOR OBTAINING THE RECIPROCAL OF A NUMBER AND THE QUOTIENT OF TWO NUMBERS

[72] Inventor: Hugh M. Sierra, Los Altos, Calif.

[73] Assignee: International Business Machines Corporation, Armonk, N.Y.

[22] Filed: Apr. 25, 1969

[21] Appl. No.: 819,331

[52] U.S. Cl. ....................................235/164, 235/156

[51] Int. Cl. ....................................G06f 7/39, G06f 7/38

[58] Field of Search ....................................235/156, 164

[56] References Cited

UNITED STATES PATENTS

| | | | |
|---|---|---|---|
| 3,527,930 | 9/1970 | Cocke et al. | 235/156 X |
| 3,229,079 | 1/1966 | Zink | 235/164 |

*Primary Examiner*—Malcolm A. Morrison
*Assistant Examiner*—James F. Gottman
*Attorney*—Hanifin and Jancin and Peter R. Leal

[57] ABSTRACT

Apparatus and method for obtaining the reciprocal of a number and the quotient of two numbers is disclosed. The dividend and divisor, after left justification of the most significant "one" of each, are supplied to an array of combinatorial logic, the output of which is a group of polynomials having positive and negative terms. Arithmetic means are provided for subtracting the negative terms of the polynomials from the positive terms thereof to obtain the reciprocal of the divisor. This reciprocal may thereafter be multiplied by the dividend by well-known multiplication means to form the desired quotient. The apparatus and method perform the described arithmetic functions according to a flow-through scheme, where a flow-through scheme is defined as a scheme not requiring iterative techniques.

7 Claims, 9 Drawing Figures

CARRY-SAVE-ADDER

| WEIGHT | $2^n$ | $2^n$ | $2^n$ | $2^{n+1}$ | $2^n$ |
|---|---|---|---|---|---|
| VARIABLE | X | Y | Z | CARRY | SUM |
| | 0 | 0 | 0 | 0 | 0 |
| | 0 | 0 | 1 | 0 | 1 |
| | 0 | 1 | 0 | 0 | 1 |
| | 0 | 1 | 1 | 1 | 0 |
| | 1 | 0 | 0 | 0 | 1 |
| | 1 | 0 | 1 | 1 | 0 |
| | 1 | 1 | 0 | 1 | 0 |
| | 1 | 1 | 1 | 1 | 1 |

*INVENTOR.*
HUGH M. SIERRA

BY *Peter R. Leal*
ATTORNEY

Patented March 7, 1972

3,648,038

6 Sheets-Sheet 3

APPARATUS AND METHOD FOR OBTAINING THE RECIPROCAL OF A NUMBER AND THE QUOTIENT OF TWO NUMBERS

BACKGROUND OF INVENTION

1. Field of the Invention

This invention relates to digital data processing systems, and more particularly to digital systems and methods for obtaining the reciprocal of a number and the quotient of two numbers.

2. Description of Prior Art

Division schemes for digital computers are generally long and time consuming in comparison with other computer functions. Consequently, many different division techniques have been formulated for digital computers in an attempt to reduce both the time of performing the function and the number of circuits involved in the performance of the function. Most of these binary division techniques can be classified into two broad categories, namely, table look up and trial-and-error.

The table look up approach, although conceptionally fast, is extremely expensive since the complexity increases with the square of the number of bits. For this reason, table look up is generally employed only to obtain a few bits of the reciprocal at the beginning of some slower division method.

The trail-and-error approach consists of subtracting, underflow, restore and shift in a repetitive sequence. To save hardware, the process is repeated over and over in a loop. This method is not as expensive as table look up, but is extremely slow.

Through the years there have been many refinements, improvements, and combinations of these two basic techniques; but each has been plagued with being either time consuming, at the expense of a reduction of hardware, or inexpensive in hardware at the expense of requiring an inordinately long time to perform the division function.

Accordingly, it is an object of my invention to provide a novel apparatus and method for obtaining the reciprocal of a number by using a flow-through technique.

It is another object of my invention to provide apparatus and a method for division of a dividend by a divisor wherein the reciprocal of the divisor is obtained utilizing flow-through techniques, said reciprocal then being multiplied by said dividend to provide a desired quotient.

It is yet another object of my invention to provide a flow-through division method which is generically different from division techniques of the prior art.

Accordingly, the foregoing and other objects, features, and advantages of my invention will be apparent from the following, more particular description of preferred embodiments of my invention, as illustrated in the accompanying drawings.

SUMMARY OF THE INVENTION

Figure 1:
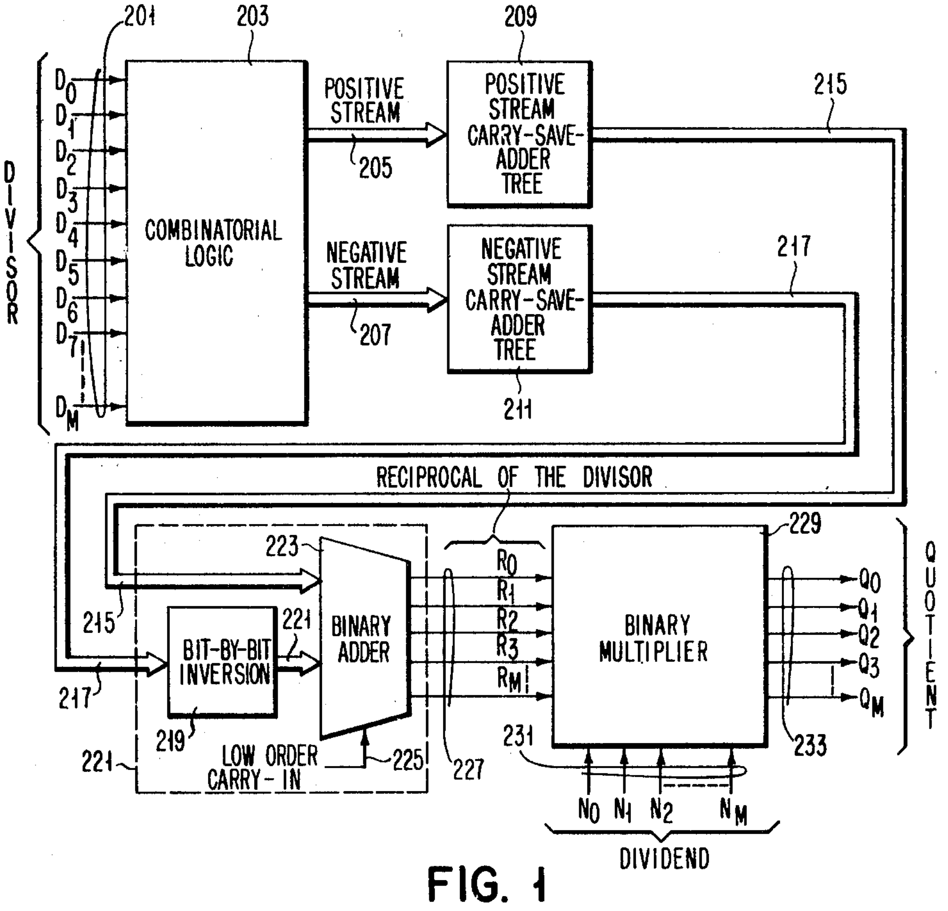
FIG. 1 is a block diagram of an implementation of my invention utilizing combinatorial logic and carry-save-adder techniques.

My invention provides a flow-through technique for obtaining a reciprocal and for performing division. In one embodiment of my invention, the reciprocal of the divisor is obtained by providing the divisor, after having its most significant "one" left justified, to combinatorial logic, the output of which logic represents positive and negative terms which make up the coefficients of the powers of 2 of the reciprocal of the divisor, said coefficients being in polynomial form. Means are provided for subtracting the negative from the positive term in each coefficient to obtain nonredundant coefficients of each power of 2 of the reciprocal of the divisor. This reciprocal can then be multiplied by the left-justified dividend in a binary multiplier to obtain the quotient.

One manner in which my invention can be implemented is to separate the output of the combinatorial logic into positive and negative terms, add said individual outputs in a positive stream carry-save-adder tree and a negative stream carry-save-adder tree, respectively, and subtract said negative stream from said positive stream to obtain said reciprocal.

DESCRIPTION OF PREFERRED EMBODIMENT UNDERLYING THEORY

Two embodiments of my invention will be described. In each embodiment, the dividend and the divisor will both be initially left justified, that is, justified such that the binary points of each number are aligned such that there is a "one" in the high order of each number. The following description of the underlying theory of my invention will be helpful in understanding the embodiments to be described. While the invention is described with reference to the binary number system, it will be recognized by those of ordinary skill in the art that the invention can be implemented in other number systems without departing from the spirit and the scope of the invention.

If $N$ is the dividend and $D$ is the divisor, the quotient can be expressed as:

$$\frac{N}{D}=\frac{0\theta \cdot N_0N_1N_2N_3N_4\ldots}{0\theta \cdot D_0D_1D_2D_3D_4\ldots}\times(2^m) \qquad (1)$$

where $N_0=D_0=1$ and $m$ is the necessary exponent (positive or negative, as the case may be) to align the numbers in such fashion. Expressing the numbers $N$ and $D$ as polynomials in powers of 2, it can be shown that, exclusive of the alignment factor, Equation (1) can be written as:

$$\frac{N_0 2^0+N_1 2^{-1}+N_2 2^{-2}+N_3 2^{-3}+\ldots}{D_0 2^0+D_1 2^{-1}+D_2 2^{-2}+D_3 2^{-3}\ldots}=1+q_1 2^{-1}+q_2 2^{-2}+q_3 2^{-3}+ \qquad (2)$$

where $q_n$ is the coefficient of a given $2^{-n}$, where $1\leq n \leq M$ and $M$ is the order of the coefficient of the highest absolute exponent of 2. This is equivalent to:

$$N_0 2^0+N_1 2^{-1}+N_2 2^{-2}+\ldots =(D_0 2^0+D_1 2^{-1}+D_2 2^{-2}+\ldots)\ (1zq_1 2^{-1}+q_2 2^{-2}+\ldots) \qquad (3)$$

Since both dividend and divisor were left justified, that is, $$N_0=D_0=11zN_1 2^{-1}+N_2 2^{-2}+\ldots=\text{iz}(D_1+q_1)2^{-1}+(D_2+D_1q_1+q_2)2^{-2}+(D_3+D_2q_1D_1q_2+q_3)2^{-3}+\ldots\ldots \qquad (4)$$

The necessary and sufficient condition for the above equation to be true is that the coefficients of equal powers of 2 in both sides of the equation must be equal. Therefore, the following set of simultaneous equations hold:

$$N_1=D_1+q_1$$
$$N_2=D_2+D_1q_1+q_2$$
$$N_3=D_3+D_2q_1+D_1q_2+q_3 \text{ etc.} \qquad (5)$$

From equations (5), the values of each $q_n$ can be found to be:

$$q_1=(N_1-D_1)$$
$$q_2(N_2-D_2)-(D_1q_1)$$
$$q_3=(N_3-D_3)-(D_2q_1+D_1q_2)$$
$$q_4=(N_4-D_4)-(D_3q_1+D_2q_2+D_1q_3)$$
$$q_n=(N_n-D_n)-(D_n-_1q_1+D_n-_2q_2+\ldots+D_2q_n-_2+D_1q_n-_1) \qquad (6)$$

It is important to note that all expressions above are strictly algebraic in nature, and are not Boolean expressions. The expression for each $q_n$ beginning with $q_2$ contain, as subparts thereof, values of preceding $q_n$'s. By substituting in each expression the expressions for all the preceding $q_n$'s contained in said expression, it can be shown that:

$$q_1=(N_1-D_1)$$
$$q_2=(N_2-D_2)-D_1(N_1-D_1)$$
$$q_3=(N_3-D_3)-D_2(N_1-D_1)-D_1(N_2-D_2)+D_1D_1(N_1-D_1)$$
$$q_4=(N_4-D_4)-D_3(N_1-D_1)-D_2(N_2-D_2)+D_2D_1(N_1-D_1)\ -D_1(N_3-D_3)+D_1D_2(N_1-D_1)+D_1D_1(N_2-D_2)-D_1D_1D_1(N_1-D_1)$$
$$q_5=(N_5-D_5)-D_4(N_1-D_1)-D_3(N_2-D_2)+D_3D_1(N_1-D_1)\ -D_2(N_3-D_3)+D_2D_2(N_1-D_1)+D_2D_1(N_2-D_2)-D_2D_1D_1(N_1-D_1) -D_1(_4-D_4)+D_1D_3(N_1-D_1)+D_1D_2(N_2-D_2)-D_1D_2D_1(N_1-D_1)+D_1D_1(N_3-D_3)-D_1D_1D_2(N_1-D_1)-D_1D_1\ D_1(N_2-D_2)+D_1DD_1D_1(N_1-D_1)$$
$$q_6=(N_6-D_6)-D_5(N_1-D_1)-D_4(N_2-D_2)+D_4D_1(N_1-D_1)\ -D_3(N_3-D_3)+D_3D_2(N_1-D_1)+D_3D_1(N_2-D_2)-D_3D_1D_1(N_1-D_1) -D_2(_4-D_4)+D_2D_3(N_1-D_1)+D_2D_2(N_2-D_2)-D_2D_2D_1(N_1-D_1)+D_2D_1(N_3-D_3)-D_2D_1D_2(N_1-D_1)-D_2D\ _1D_1(N_2-D_2)+D_{21}D_1D_1(N_1-D_1)\ -D_1(N_5-D_5)+D_1D_4(N_1-D_1)+D_1D_3(N_2-D_2)-D_1D_3D_1(N_1-D_1)+D_1D_2(N_3-D_3)-D_1D_2D_2(N_1-D_1)-D_1D_2D_1(N_2-D_2)+D_1D_2D_1D_1(N_1-D_1)+D_1D_1(N_4-D_4)-D_1D_1D_3(N_1-D_1)-D_1D_1D_2(N_2-D_2)+D_1D_1D_2D_1(N_1-D_1)-D_1D_1D\ (N_3-D_3)+D_1D_1D_1D_2(N_1-D_1)+D_1D_1D_1D_1(N_2-D_2)-D_1D_1D_1D_1D_1(N_1-D_1) \text{ etc.} \quad (7)$$

Since the divisor and dividend are, illustratively, binary numbers, each $D_n$ has only the value 0 or 1. Therefore, any $D_n$ multiplied by itself any number of times is equal to $D_n$. Also, in order to simplify equations (7), the term $(N_n-D_n)$ can be shortened to the term $B_n$. Then, simplifying Equations (7) by substituting $D_n$ for each case where $D_n$ is multiplied by itself one or more times, and also grouping terms as coefficients of $B_n$, it can be shown that Equations (7) become:

$$q_1=P_0B_1$$
$$q_2=P_0B_2+P_1B_1$$
$$q_3=P_0B_3+P_1B_2+P_2B_1$$
$$q_4=P_0B_4+P_1B_3+P_2B_2+P_3B_1$$
$$q_5=P_0B_5+P_1B_4+P_2B_3+P_3B_2+P_4B_1$$
$$q_6=P_0B_6+P_1B_5+P_2B_4+P_3B_3+P_4B_2+P_5B_1$$
$$q_7=P_0B_7+P_1B_6+P_2B_5+P_3B_4+P_4B_3+P_5B_2+P_6B_1 \text{ etc.} \quad (8)$$

Further, it can be shown that a general recursive relationship can be obtained from inspection of equations (8) as follows:

$$q_n=P_0B_n+P_1B_{n-1}+P_2B_{n-2}+P_3B_{n-3}+\ldots\ldots+P_{n-2}B_2+P_{n-1}B_1 \quad (9)$$

Comparing equations (7) and (8) by respective expressions for each $q_n$, and simplifying, it can be shown that each polynomial $P_n$ has a value in terms of coefficients of powers of 2 of the divisor, as follows:

$$P_0=1$$
$$P_1=-D_1$$
$$P_2=-D_2+D_1$$
$$P_3=-D_3+2D_2D_1-D_1$$
$$P_4=-D_4+2D_3D_1-3D_2D_1+D_2+D_1$$
$$P_5=-D_5+2D_4D_1-3D_3D_1+2D_3D_2+D_1D_2-D_1$$
$$P_6=-D_6+2D_5D_1-3D_4D_1+2D_4D_2+4D_3D_1-6D_3D_2D_1+D_1D_2+D_3-D_2+D_1 \text{ etc.} \quad (10)$$

It is necessary to remove the numerical multipliers in Equations (10). This can be done by substituting for each $P_n$ on the right side of each equation of (10) its value defined in previous equations of (10):

$$P_0=1$$
$$P_1=-(D_1P_0)$$
$$P_2=-(D_2P_0+D_1P_1)$$
$$P_3=-(D_3P_0+D_2P_1+D_1P_2)$$
$$P_4=-(D_4P_0=D_3P_1+D_2P_2+D_1P_3)$$
$$P_5=-(D_5P_0+D_4P_1+D_3P_2+D_2P_3+D_1P_4)$$
$$P_6=-(D_6P_0+D_5P_1+D_4P_2+D_3P_3+D_2P_4+D_1P_5) \text{ etc.} \quad (11)$$

It can be shown from Equations (11) that the following recursive relationship holds for each $P_n$:

$$P_n=-(D_nP_0+D_{n-1}P_1+D_{n-2}P_2+D_{n-3}P_3+\ldots+D_2P_{n-2}+D_1P_{n-1}) \quad (12)$$

As a further aid in understanding the operation of my invention, it is to be noted that by substituting for each $B_n$ in Equations (8) its corresponding expression $(N_n-D_n)$, and recalling that $N_0$ is always 1 due to initial justification, each $q_n$ can be obtained in terms of the polynomials of (11) and of the coefficients of powers of 2 of the divisor. For example:

$$q_1=P_0(N_1-D_1)=P_0N_1+P_0(-D_1)$$
$$=P_0N_1+(-D_1)=P_0N_1+P_1=P_0N_1+P_1N_0 \quad (13)$$

Proceeding in similar fashion, it can be shown that:

$$q_1=P_0N_1+P_1N_0$$
$$q_2=P_0N_2+P_1N_1P_2N_0$$
$$q_3=P_0N_3+P_1N_2+P_2N_1+P_3N_0$$
$$q_4=P_0N_4+P_1N_3+P_2N_2+P_3N_1+P_4N_0$$
$$q_5=P_0N_5+P_1N_4+P_2N_3+P_3N_2+P_4N_1+P_5N_0$$
$$q_6=P_0N_6+P_1N_5+P_2N_4+P_3N_3+P_4N_2+P_5N_1+P_6N_0 \text{ etc.} \quad (14)$$

From Equations (14), it can be seen that a recursive relationship for each value of $q_n$, in terms of $P_n$ and $N_n$ only is:

$$q_n=P_0N_n+P_1N_{n-1}+P_2N_{n-2}+P_3N_{n-3}+\ldots+P_{n-2}N_2+P_{n-1}N_1+P_nN_0 \quad (15)$$

To understand how a reciprocal of a number, such as the divisor in division, is obtained, it will be noted that for the special case of the reciprocal of the divisor, Equation (1) becomes:

$$\frac{N}{D}=\frac{0.1000000\ldots}{0.D_0D_1D_2D_3D_4\ldots}\times(2^m) \quad (16)$$

that is, the reciprocal of the divisor represents a special case where $N_0=1$; $N_1=N_2=N_3=N_4=\ldots=N_n=\ldots=N_M=0$. For this situation, Equations (14) and (15) become:

$$q_1=P_1$$
$$q_2=P_2$$
$$q_3=P_3$$
$$q_4=P_4$$
$$\cdot$$
$$\cdot$$
$$\cdot$$
$$q_n=P_n \quad (17)$$

therefore the $P_n$'s are the coefficient of the powers of 2 for $R$, the reciprocal of $D$. That is:

$$R=\frac{1}{D}=\frac{1}{1+D_12^{-1}+D_22^{-2}+D_32^{-3}+\ldots+D_n2^{-n}+\ldots}$$
$$=(1+P_12^{-1}+P_22^{-2}+P_32^{-3}+\ldots+P_n2^{-n}+\ldots) \quad (18)$$

To facilitate the obtaining of the reciprocal $R$ in binary form, Equations (10) for each $P_n$ can be rewritten in terms of ascending powers of 2, as follows:

$$P_0=1$$
$$P_1=(-D_1)2^0$$
$$P_2=(-D_2+D_1)2^0$$
$$P_3=(-D_3-D_1)2^0+(D_2D_1)2^1$$
$$P_4=(-D_4+D_2+D_1-D_2D_1)2^0+(D_3D_1-D_2D_1)2^1$$
$$P_5=(-D_5+D_2D_1-D_2D_1)2^0+(D_4D_1+D_3D_2-D_3D_1)2^1$$
$$P_6=(-D_6+D_2D_1+D_3+D_1-D_2-D_4D_1)2^0+(D_5D_1+D_4D_2-D_4D_1-D_3D_2D_1)2^1+(D_3D_1-D_3D_2D_1)2^2$$
$$P_7=(-D_7-D_1-D_5D_1-D_3D_2)2^0+(D_6D_1+D_5D_2+D_4D_3-D_5D_1-DD_2-D_4D_2D_1)2^1+(D_4D_1+D_3D_2D_1-D_4D_2D_1)2^2+(D_3DD_1-D_3D_1)2^3 \text{ etc.} \quad (19)$$

The reciprocal $R$ can then be obtained by multiplying the equation for each $P_n$ in Equations (19) by its corresponding $2^{-n}$ and adding all terms on the right-hand sides of all equations to obtain $R$. Collecting terms in like powers of 2 and simplifying yields the equation for the reciprocal $R$ as follows:

$$R=1+(-D_1)2^{-1}+(D_2D_1+D_1-D_2)2^{-2}+(D_3D_1-D_2D_1-D_1-D_3)2^{-3}+(D_4D_1+D_3D_2-D_3D_1-D_2D_1+D_2+D_1-D_4)2^{-4}+(D_5D_1+D_4D_2+D_2D_1-D_1-D_3D_2D_1-D_3D_1-D_5)2^{-5}+\ldots \quad (20)$$

By separating the positive terms from the negative terms, it can be shown that the reciprocal, $R$, can be written as:

$$R=[1+(0)2^{-1}+(D_2D_1+D_1)2^{-2}+(D_3D_1)2^{-3}+(D_4D_1+D_3D_2+D_2+D_1)2^{-4}+(D_5D_1+D_4D_2+D_2D_1)2^{-5}+\ldots\ldots]-[0+(D_1)2^{-1}(D_2)2^{-2}+(D_2D_1+D_1+D_3)2^{-3}+(D_3D_1+D_2D_1+D_4)2^{-4}+D_1+D_3D_2D_1+D_3D_1+D_5)2^{-5}+\ldots] \quad (21)$$

It will be noted that these new coefficients for the powers of 2 are not equal to the previous polynomial $P_n$, but have been obtained from the $P_n$. It will be noted that these new polynomials contain no numerical multipliers and comprise the addition of products of $D_n$. Since the $D_n$ are assumed to be binary numbers, each $D_n$ can have the value of only 1 or 0. Therefore, their products are exactly equivalent to the Boolean function AND. Therefore these products are the two-way AND-logical combinations, the three-way AND-logical combinations, the four-way AND-logical combinations, etc., of the given $D_n$. The order of the AND-combination is dictated by the accuracy to which one wishes to carry out the apparatus and method of my invention. Embodiments will now be described to illustrate the method and apparatus of my invention in a system taking into account the first five powers of 2. It will be noted that one can extend this embodiment to any power of 2, depending upon the accuracy which one desires. This can be done by extending Equations (19), (20) and (21). However, since this is well within the ordinary skill of one knowledgeable in the art, it will not be carried further here.

STRUCTURE

A first embodiment will now be described. In this embodiment, the coefficients $P_n$ are obtained in binary form. This is done by logically combining certain coefficients of powers of 2 of the divisor and subtracting predetermined ones of the combinations of these coefficients to arrive at the reciprocal of the divisor. A binary multiplier is then utilized to obtain the product of the dividend times the reciprocal of the divisor which gives the desired quotient.

Referring now to FIG. 1, there is seen one implementation of the first embodiment of my invention. The coefficients of the powers of 2 of the left-justified divisor, namely, $D_0$, $D_1$,...,$D$, form inputs over bus 201 to combinatorial logic 203. This combinatorial logic will be described in more detail subsequently. The output of the combinatorial logic 203 is logical combinations of predetermined ones of the coefficients on Bus 201. Some of these predetermined logical combinations will be of positive algebraic sign and others will be of negative algebraic sign. The respectively signed combinations will be transmitted over positive stream Bus 205 and negative stream Bus 207 to a positive stream carry-save-adder tree 209 and a negative stream carry-save-adder tree 211. These carry-save-adder trees are very similar to the usual carry-save-adder trees used in multiplication, and an illustration of them will be described in detail subsequently. Positive carry-save-adder tree 209 forms the sum of the positive signed combinations and transmits these over Bus 215. Likewise, negative carry-save-adder tree 211 forms the sum of the negatively signed logical combinations and transmits these over Bus 217. The hardware indicated generally by 213 is a subtractor to subtract the negative stream sum from the positive stream sum. This subtractor may be implemented in any manner well known to those in the art. One manner is as shown, by inverting all the bits in the negative sum in inversion unit 219 to obtain the 1's complement of the negative stream sum by bit-by-bit inversion. This quantity is then transmitted over Bus 221, and the positive stream sum is transmitted over Bus 215 to binary adder 223. A low order carry is forced into the binary adder 223 over line 225 to perform the desired subtraction. The output of the subtractor 213 is then the polynomial coefficients of the powers of 2 of the reciprocal $R$ of the divisor, namely, $R_0$, $R_1$, ...,$R_M$ on Bus 227. This reciprocal of the divisor can then be used as the multiplicand input to binary multiplier 229 while the coefficients of the powers of 2 of the dividend, namely, $N_0$, $N_1$,..., $N_M$ on Bus 231 can be used as a multiplier input to the binary multiplier. The output of the binary multiplier is then the coefficients of the powers of 2 of the quotient, namely, $Q_0$, $Q_1$,...,$Q_M$. Right justification will be required to take the initial left justification by $m$ of Equation (1) into account.

A more detailed description of the combinatorial logic indicated generally at 203 of FIG. 1 will now be given. Combinatorial logic 203 comprises two-way, three-way, four-way,...,logical AND's of the coefficients of the powers of 2 of the divisor. The number to which this logical combination is carried determines the accuracy with which the reciprocal is obtained, as explained above with respect to Equations (19), (20) and (21).

Figure 2:
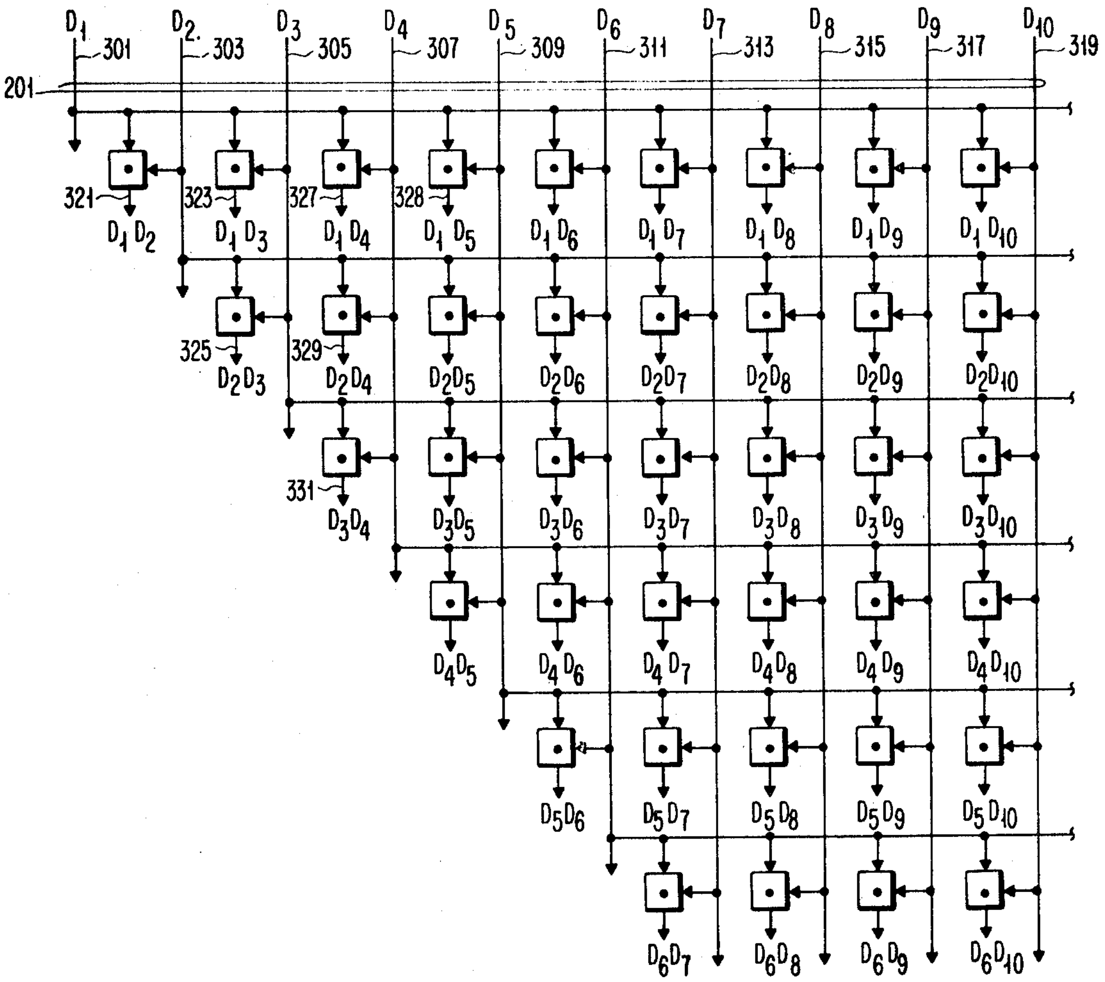
FIG. 2 is representation of two-way combinatorial logic utilized in the combinatorial logic array of FIG. 1.
Figure 3:
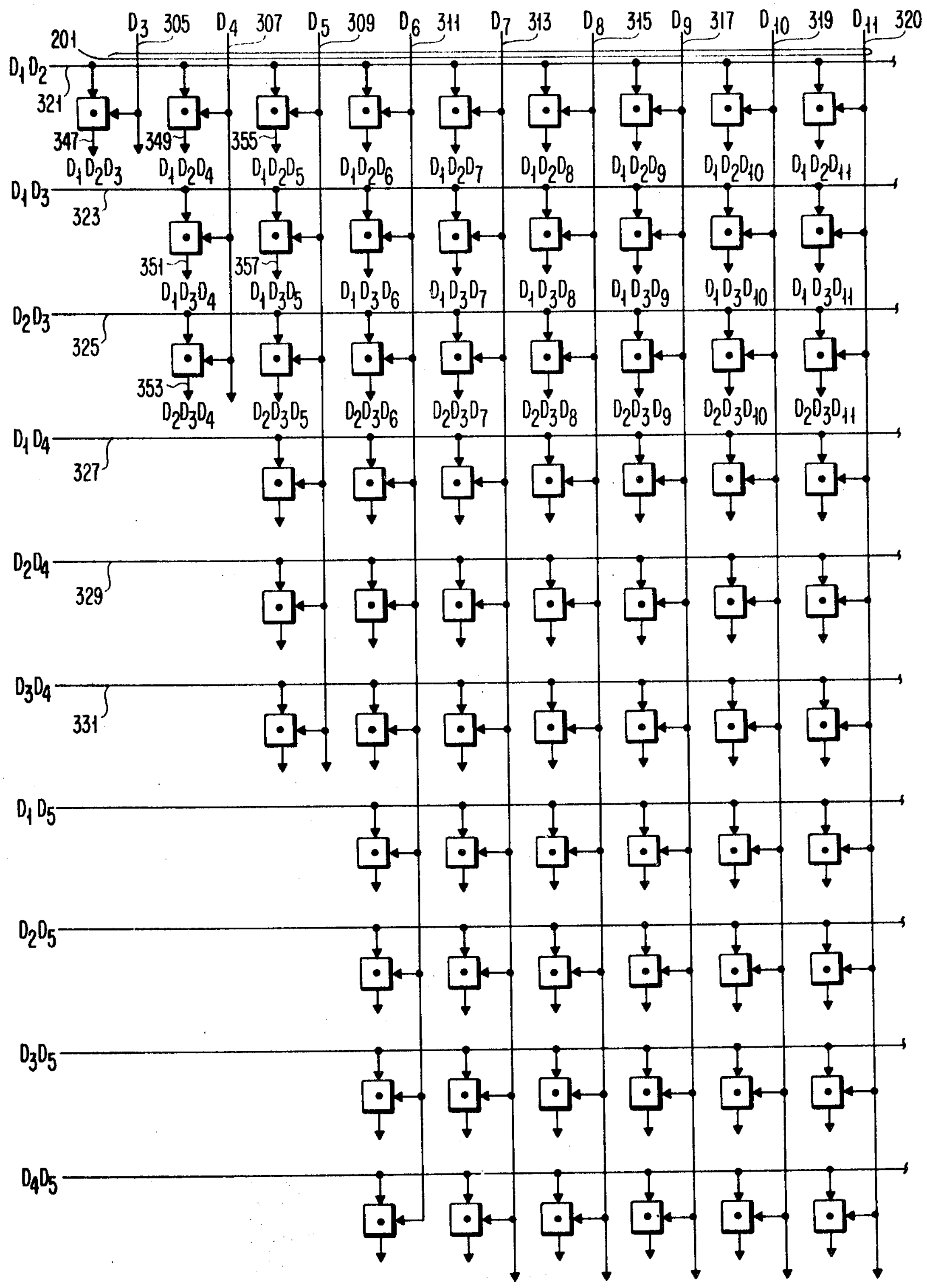
FIG. 3 is a representation of three-way combinatorial logic utilized in the combinatorial logic array of FIG. 1.
Figure 4:
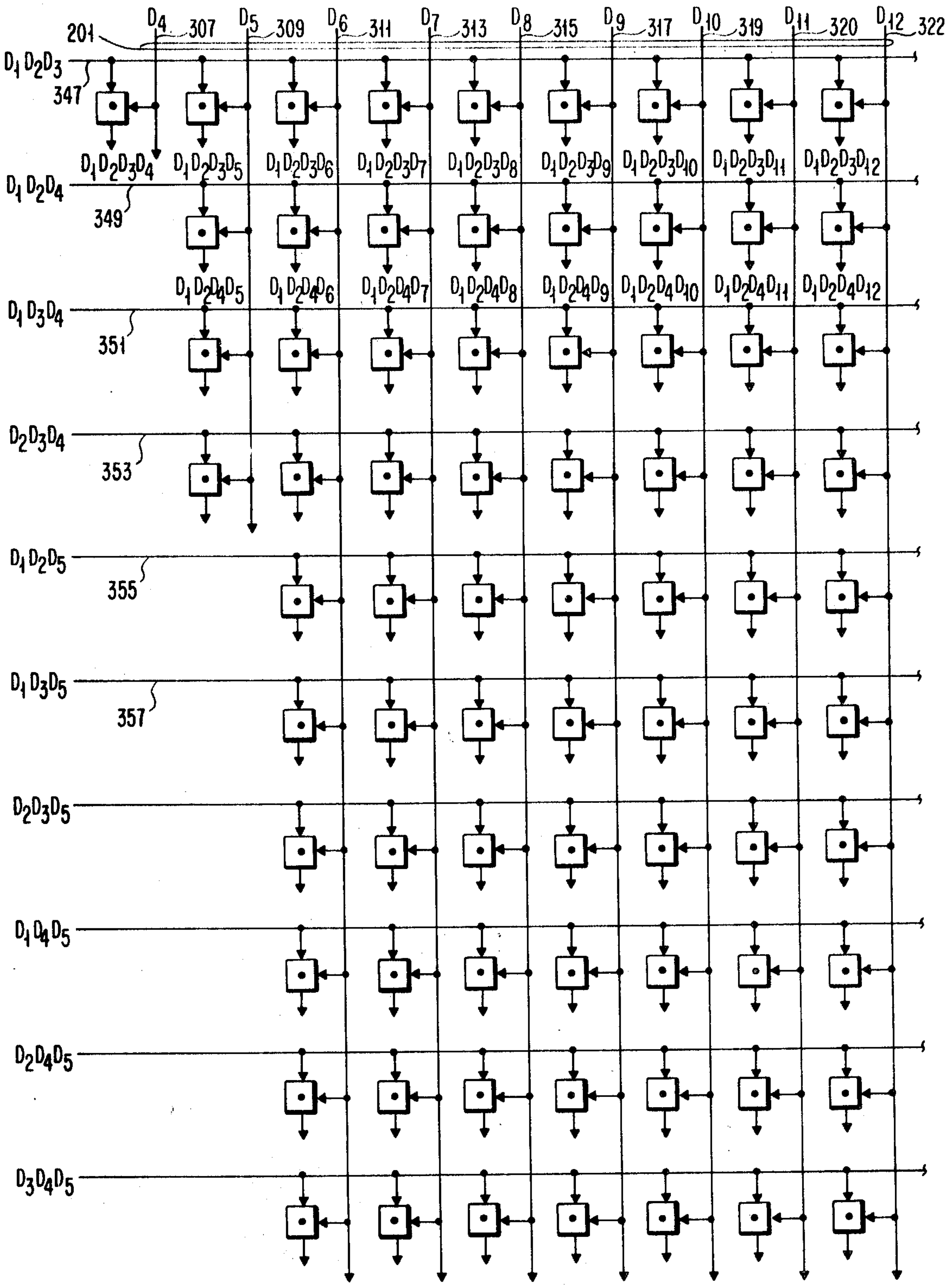
FIG. 4 is a representation of four-way combinatorial logic utilized in the combinatorial logic array of FIG. 1.

Combinatorial logic for two-way, three-way, and four-way AND-combinations is shown in FIGS. 2, 3, and 4, respectively. The input at the top of each of these figures is the various coefficients of the powers of 2 of the divisor $D$, as contained on wires which comprise Bus 201 of FIG. 1. The inputs from the side of FIGS. 3 and 4 are two-way and three-way AND-combinations, respectively, from FIGS. 2 and 3 as shown. It will be recalled with reference to Equations (20) and (21) that the reciprocal $R$ was made up of the addition of logical AND's of the coefficients of the powers of 2 of the divisor. The combinatorial logic of FIGS. 2, 3, and 4 comprise the combinatorial logic indicated generally at 203 in FIG. 1. This combinatorial logic generates the AND-functions required. For example, in FIG. 2, line 321 generates $D_1D_2$, line 325 generates $D_2D_3$, line 331 generates $D_3D_4$, and so on. The three-way combinations and the four-way combinations are similarly generated in FIGS. 3 and 4, respectively. It will be noted from Equation (21) that the expression for the reciprocal $R$ can be divided into all positive terms and all negative terms, which can be called, respectively, the positive stream 205 and the negative stream 207 of FIG. 1. The outputs of the combinatorial logic are then connected to the desired powers of 2 as shown. For example, line 301 and line 321 of FIG. 2 are segregated out to comprise the inputs to the positive stream for the coefficient of $2^{-2}$. Likewise, line 323 of FIG. 2 is segregated out as the input for $2^{-3}$ in the positive stream. Referring to the negative stream of Equation (21) and also again to FIG. 2, it can be seen that the coefficient for $2^{-1}$ is $D_1$ from line 301, the coefficient for $2^{-2}$ is $D_2$ from line 303, the coefficient for $2^{-3}$ will be obtained from $D_2D_1$ of line 321, $D_1$ of line 301, and $D_3$ of line 305. Coefficients of the various powers of 2 can be obtained in a manner similar to that explained above. Thus, the contents of the positive stream 205 and the negative stream 207 of FIG. 1 can be segregated from the outputs of combinatorial logic 203 to form inputs for the various powers of 2 to the positive and negative stream carry-save-adder trees.

Figure 5:
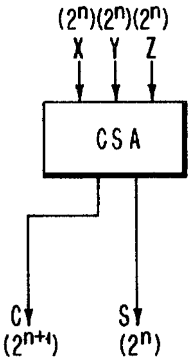
FIG. 5 is a representation of a carry-save-adder and the truth table therefor.

Before describing the carry-save-adder trees, a brief description of the function of a carry-save-adder will be given. Referring now to FIG. 5, there is seen a carry-save-adder having three inputs of weight $2^n$. These inputs are denoted $x$, $y$, and $z$. The carry-save-adder is an adder which forms the sum S which is given weight $2^n$ and the carry C which is given weight $2^{n+1}$. If there are more variables to be added in a given binary weight $n$, then this sum with weight $2^n$ will be added in another adder in the same binary weight, or position, in the carry-save-adder tree. The carry in a carry-save-adder is given the binary weight $2^{n+1}$ which means that the carry is provided as an input to the next stage in the next higher order weight, or binary position, in the carry-save-adder tree. This is indicated by the broken line for the output C for the carry-save-adder in FIG. 5. The function performed by the carry-save-adder is given by the truth table in FIG. 5. The sum and the carry are generated according to the input variable values $x$, $y$, and $z$ as shown.

The first five powers of 2 of the positive stream carry-save-adder tree will now be described, with reference to FIG. 6. It will be recalled that the inputs to the positive stream were derived from the combinatorial logic as explained previously.

Figure 6:
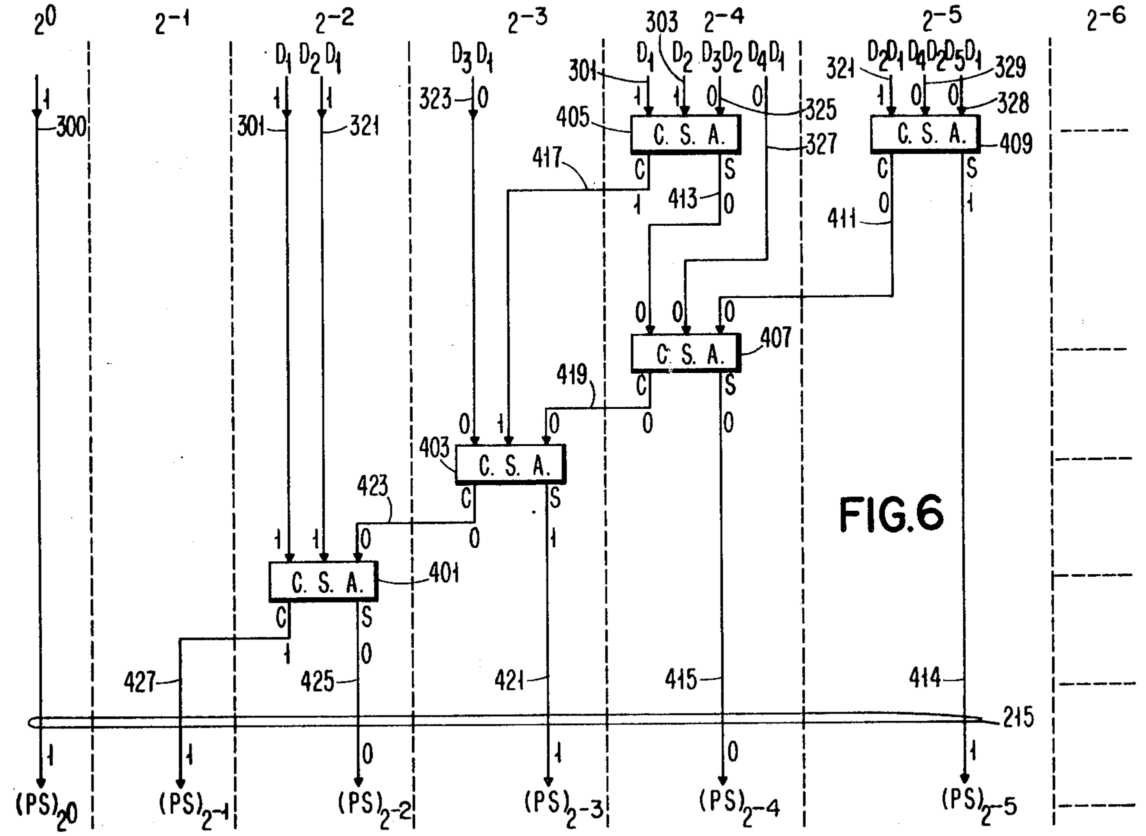
FIG. 6 is a representation of the positive stream carry-save-adder tree of FIG. 1, for the first five powers of 2.

As seen in FIG. 6, and also from Equation (21), the coefficient for $2^0$ is unity, from line 300 of FIG. 1. As seen from Equation (21), there is no coefficient of $2^{-1}$ in the positive stream. The coefficient of $2^{-2}$ according to Equation (21) is the sum of $D_1$ and $D_2D_1$. Therefore, lines 301 and 321 form inputs to carry-save-adder 401. The coefficient of $2^{-3}$ in the positive stream according to Equation (21) is $D_3D_1$. Therefore, line 231 forms an input to carry-save-adder 403. The coefficient of $2^{-4}$ in the positive stream is the sum of $D_4D_1$, $D_3D_2$, $D_2$, and $D_1$. It will be noted that there are four variables for this coefficient. Any three of them can be connected as inputs in the first stage of the carry-save-adder tree for $2^{-4}$ and the fourth can be an input to the second stage of the carry-save-adder tree for this power. Illustratively, lines 301, 303, and 325 form inputs to first stage carry-save-adder 405 while line 327 forms an input to second stage carry-save-adder 407. The coefficient of $2^{-5}$ in the positive stream is the sum of $D_5D_1$, $D_4D_2$, and $D_2D_1$. Therefore, lines 321, 328, and 329 form inputs to carry-save-adder 409 for $2^{-5}$.

The sum from carry-save-adder 409 forms the coefficient of $2^{-5}$ in the positive stream on Bus 215. The carry from this adder forms an input to the next higher order stage, namely $2^{-4}$ in this case. Therefore, line 411 forms an input to carry-save-adder 407 which is the second stage of the carry-save-adder tree for $2^{-4}$. Similarly, the sum from carry-save-adder 405 forms an input to carry-save-adder 407 as does line 327. The sum over line 415 from carry-save-adder 407 forms the coefficient of $2^{-4}$ in the positive stream. There are two stages in the carry-save-adder tree for $2^{-4}$ and the carry out of each of these carry-save-adders is used as an input variable to the carry-save-adder tree for the next higher order power of 2, $2^{-3}$ in this case, over lines 417, 419. The sum out of carry-save-adder 403 over line 421 therefore becomes the coefficient of $2^{-3}$ for the positive stream. The carry from carry-save-adder 403 goes to the next higher stage, $2^{-2}$, over line 423 as shown. The sum from carry-save-adder 401, over line 425, forms the coefficient of $2^{-2}$ in the positive stream. The carry out of carry-save-adder 401, over line 427, forms an input to the next higher stage, $2^{-1}$. Since there are no other inputs to $2^{-1}$, the carry from carry-save-adder 401 stands alone as the coefficient for $2^{-1}$ in the positive stream. It will, of course, be recognized by those skilled in the art that if the implementation is carried to powers beyond $2^{-5}$, for example $2^{-6}$, $2^{-7}$,..., then carry's will be generated from the higher order carry-save-adders and will ripple downwardly in the carry-save-adder tree, perhaps requiring more stages of carry-save-adders than for a given power of 2 as shown here. However, since this can be implemented with only ordinary skill in the art, it will not be described in more detail here.

The lines tied together as Bus 215 on FIG. 6 are the output of the positive stream carry-save-adder tree.

Figure 7:
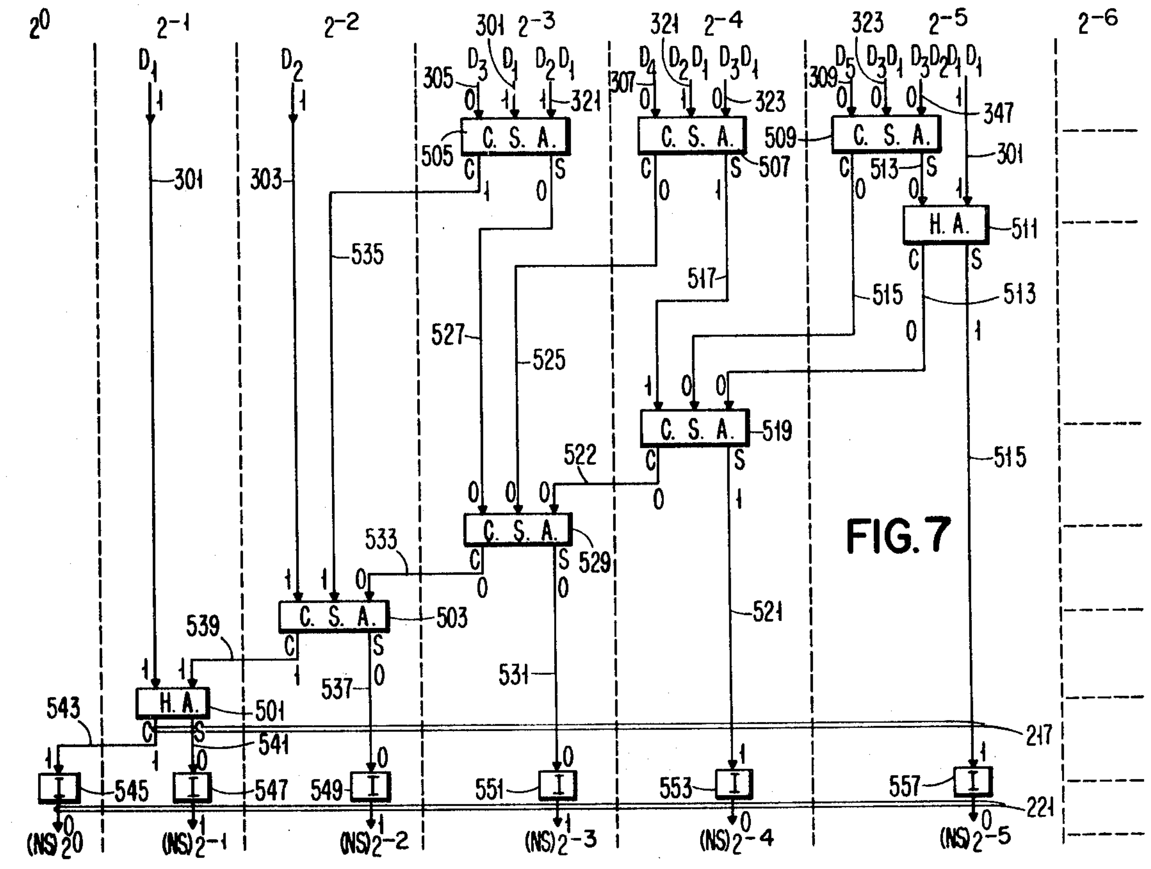
FIG. 7 is a representation of the negative stream carry-save-adder tree for the first five powers of 2.

Turning now to FIG. 7, there is seen the negative stream carry-save-adder tree for the first five powers of 2. With reference again to Equation (21), it can be seen that the coefficient of $2^0$ is zero so that there is no output from the combinatorial logic 203 of FIG. 1 to the negative stream 207. The coefficient of $2^{-1}$ is $D_1$ so that line 301 forms an input to half adder 501. A half adder is used instead of a carry-save-adder in this case, since, as will subsequently be seen, there will be only two variables rather than the usual three variables for the coefficient of $2^{-1}$, in the present embodiment. The coefficient of $2^{-2}$ in Equation (21) is $D_2$. Therefore, the output from combinatorial logic of FIG. 2 into the negative stream for $2^{-2}$ is line 303. Line 303 is connected to carry-save-adder 503. The coefficient of $2^{-3}$ in the negative stream is the sum of $D_2D_1$, $D_1$ and $D_3$ so that the inputs to carry-save-adder 505 are lines 305, 301, and 321 all from the output of the combinatorial logic seen in detail in FIG. 2. The coefficient of $2^{-4}$ in the negative stream is the sum of $D_3D_1$, $D_2D_1$, and $D_4$. Therefore, the inputs to carry-save-adder 507 are lines 307, 321, and 323 from FIG. 2. The coefficient of $2^{-5}$ in the negative stream is the sum of $D_1$, $D_3D_2D_1$, and $D_5$. Therefore, the outputs from the combinatorial logic which are fed into the carry-save-adder 509 are lines 309, and 323 from FIG. 2 and line 347 from FIG. 3, a three-way AND. Also, line 301 forms an input to half adder 511. The sum from carry-save-adder 509 forms another input to half adder 511 over line 513. The sum output of half adder 511 is the coefficient of $2^{-5}$ on line 515 of Bus 217. The carry output of half adder 511 as well as the carry output of carry-save-adder 509 are moved upwardly one higher order power to form the inputs to carry-save-adder 519 in the second stage of the carry-save-adder tree for the position of $2^{-4}$, via lines 513, 515. The sum output of carry-save-adder 507 also becomes the third input to carry-save-adder 519 over line 517. The sum output of carry-save-adder 519 becomes the coefficient for $2^{-4}$ in the negative stream over line 521 of Bus 217. The carry output 522 of carry-save-adder 519 is moved to one order higher as is the carry output 525 of carry-save-adder 507. Both of these become inputs to carry-save-adder 529. The sum output 527 from carry-save-adder 505 becomes the third input to carry-save-adder 529. The sum output 531 of carry-save-adder 529 becomes the coefficient of $2^{-3}$ in the negative stream on line 531 of Bus 217. The carry output 533 of carry-save-adder 529 as well as the carry output 535 of carry-save-adder 505 are moved up one higher order power of 2 and become inputs to carry-save-adder 503. Likewise, line 303, which was the solitary input for $2^{-2}$ of the output of the combinatorial logic in the negative stream, becomes the third variable input to carry-save-adder 503. The sum output 537 from carry-save-adder 503 becomes the coefficient of $2^{-2}$ on line 537 of Bus 217. The carry output 539 of carry-save-adder 503 is moved up one power of 2 higher and becomes one input for half adder 501 which has as its other input line 301. A half adder is used here, as was done in the $2^{-5}$ order inasmuch as only two variables are present. The sum output of half adder 501 becomes the coefficient of $2^{-1}$ in the negative stream on line 541 of Bus 217. The carry output 543 of half adder 501 is moved upward one power of 2 and becomes the coefficient of $2^0$ in the negative stream Bus 217.

As mentioned previously, for higher accuracy, Equation (21) can be carried to further negative powers of 2 than $2^{-5}$. In that case, carries rippling from higher orders of the carry-save-adder tree would add more stages of carry-save-adders to the overall tree. However, since this is well within the ordinary skill of the art, it will not be discussed further here.

A bit-by-bit inversion block seen generally at 219 in FIG. 1 may comprise an inverter for each output line of the carry-save-adder tree in the negative stream, such as 545, 547,...557. The outputs of these inverters are grouped together as Bus 221, and are fed as the negative stream input to binary adder 223 of FIG. 1. Bus 215 of FIG. 1 likewise is fed as the positive stream input to binary adder 223. A low order carry is forced in over line 225 to allow subtraction. The output of binary adder 223 is the reciprocal $R$, comprising coefficients $R_0$, $R_1$,...,$R_M$ which are the coefficients of the corresponding negative powers of 2. As seen by Equation (18), the reciprocal $R$ is given by 1 + (coefficients of negative powers of 2). That is, if it is desired to obtain the reciprocal of $D$, the digits of the reciprocal can be taken from Bus 227 and the value of the reciprocal is either 1.0000... if $D$ was unity, or otherwise is $0.R_1R_2R_3,...,R_M$ shifted relative to the binary point to correct for the original alignment of $D$ with respect to $N$ in Equation (1) where, for the reciprocal, $N$ is effectively 1.0000.... That is, the digits of the reciprocal must be shifted $m$ positions to the left if $m$ in Equation (1) was positive or $m$ positions to the right if $m$ was negative. If it is further desired to obtain the quotient. the unshifted digits $R_0R_1R_2,...,R_M$ form one set of inputs to binary multiplier 229 as shown while the coefficients of the powers of 2 of the left justified dividend form the other set of inputs. Binary multiplier 229 can be any ordinary multiplier known in the art. The output over Bus 233 is the coefficients of the powers of 2 of the quotient, namely, $Q_0$, $Q_1$,...,$Q_M$. The quotient can now be justified by the factor $m$ to take into account the original alignment factor of Equation (1).

An operative example of the embodiment of my invention will now be given, with reference to the binary inputs and outputs assigned to the lines on FIGS. 6 and 7.

EXAMPLE $$\left.\begin{array}{l} N=21=10101=0.10101\times 2^5 \\ D=1.75=1.11=0.111\times 2^1 \end{array}\right\}$$

$$\left.\begin{array}{ll} N=10101.0000\ldots=\underbrace{.10101}_{.N_0N_1N_2N_3N_4}\times 2^5 \\ D=1.1100000\ldots=\underbrace{.111000}_{.D_0D_1D_2D_3D_4D_5}\ldots\times 2^1 \end{array}\right\}\text{alignment factor for quotient is } m=4$$

The expected reciprocal is:

$$R=\frac{1}{D}=\frac{1.0000000\ldots}{1.1100000\ldots}=0.100100100100100\ldots$$

For this case we have:

$$D_0=1\ D_1=1\ D_2=1$$

$$D_3=D_4=D_5=\ldots=0$$

From the combinatorial logic we will obtain:

FIG. 2, line 321 $D_2D_1=1$
FIG. 2, line 301 $D_1=1$
FIG. 2, line 303 $D_2=1$
(All other outputs are zero)

As shown by the binary inputs and outputs of FIGS. 6 and 7, in conjunction with the truth table of FIG. 5, the outputs of the carry-save-adder trees are:

Positive Stream Bus 215=1,10101
Negative Stream Bus 217=1.00011

Therefore, the output of the binary adder 223 of FIG. 1 will give:

| | | |
|---|---|---|
| Positive stream | 1. 10101 | (215 from Fig. 6) |
| | + | |
| Inverse of negative stream (NS) | 0. 11100 | (221 from Fig. 7) |
| Low order carry in reciprocal R | +. 00001 | (225 from Fig. 1) |
| | 0. 10010 | |
| | $R_0R_1R_2R_3R_4R_5$ | |

Therefore the computed reciprocal is $R$=0.10010... which represents the first five digits of the expected reciprocal given above. Greater accuracy can be achieved, as mentioned previously, by carrying the implementation of the positive and negative stream carry-save-adder trees to more than five powers of 2. However, since this extension involves only ordinary skill in the art, and since an illustration of this extension would serve only to clutter this application, no extension of the carry-save-adder trees will be given at this point. It will be noted that no alignment adjustment is required for the reciprocal in this example since for a reciprocal the numerator is always 1.0000... and, in this example, $D$ was 1.1100.... Hence, the binary points in both the numerator and $D$ were originally left justified one position, and therefore $m$ for the reciprocal is 0. To obtain the quotient, the unshifted digits of the reciprocal can then be multiplied in multiplier 229 by the dividend $N$ given above and the result right justified by four positions relative to the binary point, since for the quotient $m$ is 4, to give the final answer which would be a binary 12.

Figure 8:
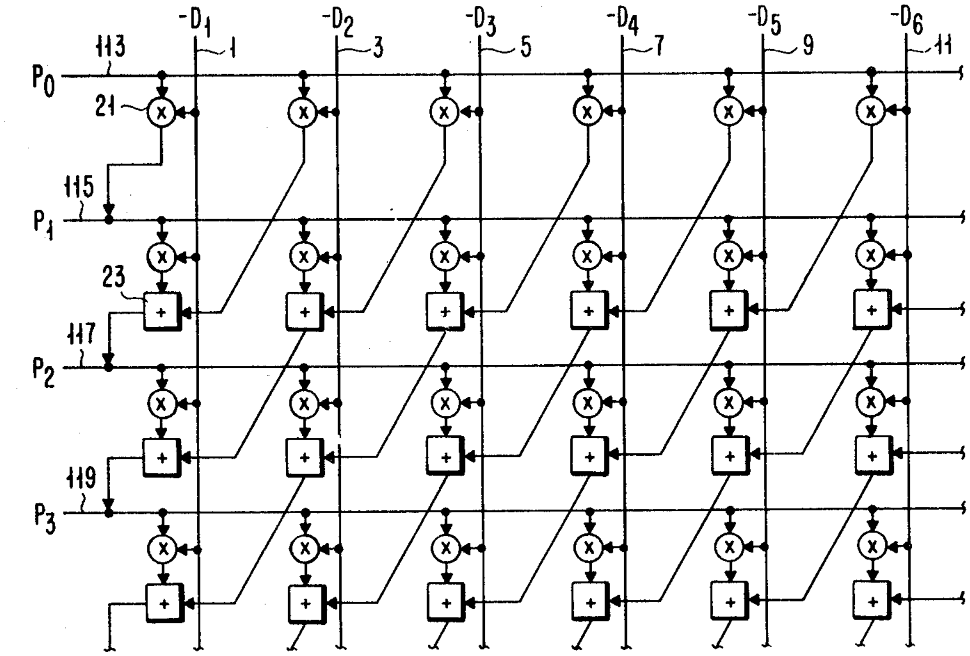
FIGS. 8 and 9 represent a second implementation of my invention.
Figure 9:
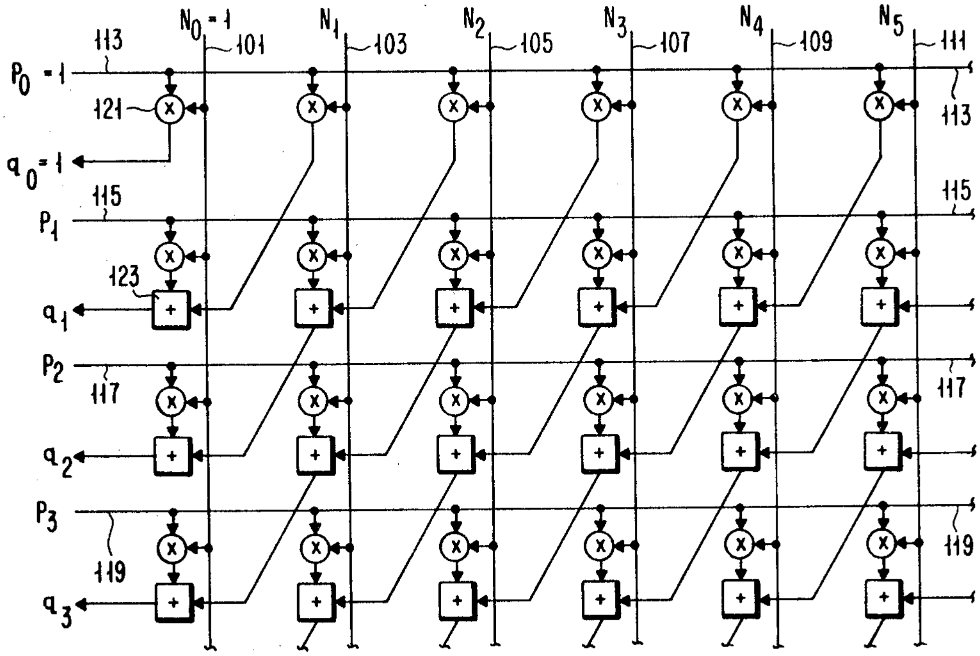

A second embodiment of my invention is seen in FIGS. 8 and 9. The $P_n$ outputs of FIG. 8 form the $P_n$ inputs of FIG. 9. FIG. 8 is a schematic representation of an implementation of Equations (11). This implementation is very serial because we can obtain $P_-$ only after we have obtained $P_2$ and $P_1$. We can only obtain $P_4$ after we obtain $P_3$, etc. Circuits such as 23 perform addition and can be implemented in binary form by carry-save-adder trees. Circuits such as 21 perform multiplication and can be implemented by binary multipliers. Therefore, the $P_n$ can be obtained in binary form, with negative $P_n$ in 2's complement form.

FIG. 9 is the schematic representation of the multiplication of:

$$(P_0+P_12^{-1}+P_22^{-2}+P_32^{-3}+\ \ldots)\times(N_0+N_12^{-1}+N_22^{-2}+N_32^{-3}+\ \ldots\ldots\ldots.)$$

which gives Equation (14). Therefore, since $P_n$ and $N_n$ are in binary form, FIG. 9 can be implemented by a well known and straight forward binary multiplier. An example according to this approach is shown below:

EXAMPLE $$\frac{25}{5}=5\frac{11001}{00101}=\frac{0.11001}{0.10100}\times(2^2)$$

$$N_0=1\quad D_0=1$$
$$N_1=1\quad D_1=0$$
$$N_2=0\quad D_2=1$$
$$N_3=0\quad D_3=0$$
$$N_4=1\quad D_4=0$$

$P_0=1$
$P_1=-(D_1P_0)=-(0\times 1)=0$
$P_2=-(D_2P_0=D_1P_1)=-(1\times 1+0)=-1$
$P_3=-(D_3P_0+D_2P_1+D_1P_2)=-(0+1\times 0+0)=0$
$P_0)==-(D_4P_0+D_3P_1+D_2P_2+D_1P_3)=-(0+0-1\times 1+0)=1$
$P_5=-(\ldots+D_2P_3+D_1P_4)=-(1\times 0+0)=0$
$P_6=-(\ldots+D_2P_4+D_1P_5)=-(1\times 1+0)=-1$
$P_7=-(\ldots+D_2P_5+D_1P_6)=-(1\times 0+0)=0$
$P_8=-(\ldots+D_2P_6+D_1P_7)=-(-1\times 1+0)=1$
$P_9=-(\ldots+D_2P_7+D_1P_8)=-(1\times 0+0)=-0=0$
$P_{10}=-(\ldots+D_2P_8+D_1P_9)=-(1\times 1+0)=-1$ etc.
$q_1=P_0N_1+P_1N_0=(1\times 1)=1$
$q_2=P_0N_2+P_1N_1+P_2N_0=(0+0+(-1)\times 1)=-1$
$q_3=P_0N_3+P_1N_2+P_2N_1+P_3N_0=(0+(-1)+0)=-1$
$q_4=P_0N_4+P_1N_3+P_2N_2+P_3N_1+P_4N_0=(1+0+0+0+1)=2$
$q_5=P_0N_5+P_1N_4+P_2N_3+P_3N_3+P_4N_1+P_5N_0=(0+0+0+0+1+0)=1$
$q_6=P_0N_6+P_1N_5+P_2N_4+P_4N_2+P_5N_1+P_6N_0=(0+0+(1\quad\times -1)+0+(-1)+)=-2$
$q_7=P_0N_7+P_1N_6+P_2N_5+P_3N_4+P_4N_3+P_5N_2+P_6N_0+P_7N_0=(-1+0)=-1$
$q_8=P_0N_8+P_1N_7+P_2N_6+P_3N_5+P_4N_4+P_5N_3+P_6N_2+P_7N_1+P_8N_0=(1+1)=2$
$q_9=P_0N_9+P_1N_8+P_2N_7+P_3N_6+P_4N_5+P_5N_4+P_6N_3+P_7N_2+P_8N_1+P_9N_0=(1)=1$
$q_{10}=P_0N_{10}+P_1N_9+P_2N_8+P_3N_7+P_4N_6+P_5N_5+P_6N_4+P_7N_3+P_8N_2+P_9N_1+P_{10}N_0=(-1-1)=-2$ etc.

Expressing the $q$'s in binary form with the proper power of 2 attached to each one, we have:

$$1+q_12^{-1}+q_22^{-2}+q_32^{-3}+q_42^{-4}+q_52^{-5}+q_62^{-6}+q_72^{-7}+q_82^{-8}+\ldots$$

| | | | | | | | | | | |
|---|---|---|---|---|---|---|---|---|---|---|
| $q_0$ | 1 | | | | | | | | | |
| $q_1$ | | 1 | | | | | | | | |
| $q_2$ | | | −1 | | | | | | | |
| $q_3$ | | | | −1 | | | | | | |
| $q_4$ | | | | 1 | 0 | | | | | |
| $q_5$ | | | | | | 1 | | | | |
| $q_6$ | | | | | | −1 | 0 | | | |
| $q_7$ | | | | | | | | −1 | | |
| $q_8$ | | | | | | | | 1 | 0 | |
| $Q=(2^2)\times$[1. | | 0 | 1 | 0 | 0 | 0 | 0 | 0 | 0 | . . .] |

$Q$=101.0000000..............=5

Further embodiments of my invention can easily be made by logical simplification of the above disclosure by use of truth tables and Karnaugh maps. Since these methods are easily within the scope of those skilled in the art, they will not be described further here.

While my invention has been particularly shown and described with reference to preferred embodiments thereof, it will be understood by those skilled in the art that the foregoing and other changes in form and detail may be made therein without departing from the spirit and scope of my invention.

I claim:

1. The method of forming electrical signals representative of the reciprocal of a left justified number, said number having coefficients $D_0, D_1, D_2, \ldots, D_n, \ldots, D_M$, said method including the steps of:

obtaining first electrical signals representative of each of said coefficients;

obtaining the logical AND-function of predetermined ones of said first electrical signals to form second electrical signals representative of first functions of selected ones of said predetermined ones of said first electrical signals, and third electrical signals representative of second functions of selected ones of said predetermined ones of said first electrical signals;

respectively adding the components said second electrical signals and respectively adding the components of said third electrical signals to form the sum of said components of said second electrical signals and the sum of said components of said third electrical signals; and subtracting the sum of said components of said third electrical signals from the sum of said components of said second electrical signals such that electrical signals representative of the coefficients of the terms of said reciprocal are formed according to the equation $$R=[1+(0)2^{-1}+(D_2D_1+D_1)2^{-2}+(D_3D_1)2^{-3}+(D_4D_1+D_3D_2+D_2+D_1)2^{-4}+(D_5D_1+D_4D_2+D_2D_1)2^{-5}+\ldots]-[0+(D_1)2^{-1}+(D_2)2^{-2}+(D_2D_1+D_1+D_3)2^{-3}+(D_3D_1+D_2D_1+D_4)2^{-4}+(D_1+D_3D_2D_1+D_3D_1+D_5)2^{-5}+\ldots],$$

where $R$ represents the reciprocal of said number.

2. The method of claim 1 further including the step of multiplying said electrical signals representative of the coefficients of the terms of said reciprocal by electrical signals representative of the coefficients of the terms of a dividend to form a quotient.

3. Apparatus for providing electrical signals representative of the coefficients of the binary terms of the reciprocal of a number $D$, wherein $D$ has as coefficients of its terms $2^0, 2^{-1}, 2^{-2}, \ldots, 2^{-n}, \ldots, 2^{-M}$, the quantities $D_0, D_1, D_2, \ldots, D_n, \ldots, D_M$, respectively, comprising, in combination:

a plurality of input lines for transmitting first electrical signals representative of the coefficients of terms of $D$;

combinatorial logic means connected to said input lines for providing second electrical signals representative of the logical AND-functions of selected ones of said first electrical signals;

addition means coupled to said input lines and to said combinatorial logic means for adding preselected ones of said first electrical signals and said second electrical signals to yield third electrical signals representative of the sum of first functions of preselected ones of said coefficients, and for adding preselected ones of said first electrical signals and said second electrical signals to yield fourth electrical signals representative of the sum of second functions of the preselected ones of said coefficients; and means responsive to said addition means for subtracting said fourth electrical signals from said third electrical signals such that fifth electrical signals representative of the coefficients of the terms of said reciprocal are formed according to the equation $$R=[1+0)2^{-1}+(D_2D_1+D_1)2^{-2}+(D_3D_1)2^{-3}+(D_4D_1+D_3D_2+D_2+D_1)2^{-4}+(D_5D_1+D_4D_2+D_2D_1)2^{-5}+\ldots]-[0+(D_1)2^{-1}+(DAH2)2^{-2}+(D_2D_1+D_1+D_3)2^{-3}+(D_3D_1+D_2D_1+D_4)2^{-4}+(D_{1c0}+D_3D_2D_1+D_3D_1+D_5)2^{-5}+\ldots],$$

where $R$ represents the reciprocal of said number.

4. Divider circuitry for providing the quotient of a divisor and a dividend, the terms of said divisor having coefficients $D_0, D_1, D_2, \ldots, D_n, \ldots, D_M$ and the terms of said dividend having coefficients $N_0, N_1, N_2, \ldots, N_n, \ldots, N_M$, comprising in combination;

a plurality of input lines for transmitting first electrical signals representative of the coefficients of terms of the divisor;

combinatorial logic means connected to said input lines for providing second electrical signals representative of the logical AND-functions of selected ones of said first electrical signals;

addition means coupled to said input lines and to said combinatorial logic means for adding preselected ones of said first electrical signals and said second electrical signals to yield third electrical signals representative of the sum of first functions of preselected ones of said coefficients of said divisor, and for adding preselected ones of said first electrical signals and said second electrical signals to yield fourth electrical signals representative of the sum of second functions of preselected ones of said coefficients of said divisor;

means responsive to said addition means for subtracting said fourth electrical signals from said third electrical signals such that fifth electrical signals representative of the coefficients of the terms of the reciprocal of the divisor are formed according to the equation $$R=[1+(0)2^{-1}+(D_2D_1+D_1)2^{-2}+(D_3D_1)2^{-3}+(D_4D_1+D_3D_2+D_2+D_1)2^{-4}+(D_5D_1+D_4D_2+D_2D_1)2^{-5}+\ldots]-[0+(D_1)2^{-1}+(_2)2^{-2}+(D_2D_1+D_1+D_3)2^{-3}+(D_3D_1+D_2D_1+D_4)2^{-4}+(D_1+D_3D_2D_1+D_3D_1+D_5)2^{-5}+\ldots],$$

where $R$ represents the reciprocal of said number; and multiplier means responsive to said subtraction means for respectively multiplying said fifth electrical signals by sixth electrical signals representation of the coefficients $N_0, N_1, N_2, \ldots, N_n, \ldots, N_M$ of the terms of said dividend to produce seventh electrical signals representative of the coefficients of the terms of said quotient.

5. Division circuitry for producing a quotient of a justified dividend $D$, the terms of said justified dividend having coefficients $D_0, D_1, D_2, \ldots, D_n, \ldots, D_n, \ldots, D_M$, and a justified divisor $N$, the terms of said justified divisor having coefficients $N_0, N_1, N_2, \ldots, N_n, \ldots, N_M$, comprising, in combination:

first arithmetic means receiving input signals representative of said coefficients $D_1, D_2, \ldots, D_n, \ldots, D_M$, and of the value unity, said first arithmetic means comprising multiplier and addition means, and for providing a group of output electrical signals representative of polynomials $P_0, P_1, P_2, \ldots, P_n, \ldots, P_M$, where $P_0$ is unity, according to the relationship $$P_n=-(D_nP_0+D_{n-1}P_1+D_{n-2}P_2+D_{n-3}P_3+\ldots+D_2P_{n-2}+D_1P_{n-1})$$

where $n=1, 2, \ldots, M$; and second arithmetic means responsive to said first arithmetic means, having as inputs electrical signals representative of said polynomials and electrical signals representative of the coefficients $N_0, N_1, N_2, \ldots, N_n, \ldots, N_M$, said second arithmetic means performing multiplicative and additive operations on said inputs to provide output electrical signals representative of the coefficients of the terms of said quotient.

6. The method of obtaining electrical signals representing the coefficients $P_0, P_1, P_2, \ldots, P_n, \ldots, P_M$, of the terms of the reciprocal of an algebraic number $D$, the terms of said number having coefficients $D_0, D_1, D_2, \ldots, D_n, \ldots, D_M$, comprising the steps of:

assigning the value of unity to an electrical signal representative of $P_0$;

obtaining electrical signals representative of the coefficients $D_0, D_1, D_2, \ldots, D_n, \ldots, D_M$;

logically combining said signals representative of the coefficients $D_0, D_1, D_2, \ldots, D_n, \ldots, D_M$, according to the relationship $$P_n=-(D_nP_0+D_{n-1}P_1+D_{n-2}P_2+D_{n-3}P_3+\ldots+D_2P_{n-2}+D_1P_{n-1})$$

where $n=1, 2, \ldots, M$, to form electrical signals representing said coefficients of the terms of said reciprocal.

7. The method of claim 6, further including the step of: multiplying said electrical signals representative of the coefficients $P_0, P_1, P_2, \ldots, P_n, \ldots, P_M$, of the terms of said reciprocal with electrical signals representative of the coefficients $N_0, N_1, N_2, \ldots, N_n, \ldots, N_M$, of the terms of a number $N$, to form a set of electrical signals representative of the terms of the quotient of $N$ divided by $D$.

* * * * *